United States Patent
Tateishi et al.

(10) Patent No.: US 8,365,281 B2
(45) Date of Patent: Jan. 29, 2013

(54) DETERMINING WHETHER METHOD OF COMPUTER PROGRAM IS A VALIDATOR

(75) Inventors: Takaaki Tateishi, Kanagawa-ken (JP); Marco Pistoia, Hawthorne, NY (US); Omer Tripp, Herzelyia (IL); Ryan Berg, Littleton, MA (US); Robert Wiener, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/950,432

(22) Filed: Nov. 19, 2010

(65) Prior Publication Data

US 2012/0131669 A1 May 24, 2012

(51) Int. Cl.
*G06F 11/00* (2006.01)
*G06F 11/30* (2006.01)
*H04L 29/06* (2006.01)
*H04L 9/32* (2006.01)

(52) U.S. Cl. ........... 726/22; 713/166; 713/180; 713/188
(58) Field of Classification Search .................... 726/22; 713/166, 180, 188
See application file for complete search history.

(56) References Cited

PUBLICATIONS

N. Klarlund et al., "MONA Version 1.4 User Manual," BRICS Department of Computer Science, University of Aarhus, Denmark, Jan. 2001.

A. Moller et al., "The Pointer Assertion Logic Engine," Proceedings of ACM SIGPLAN 2001, year 2001.
A.S. Christensen et al., "Precise Analysis of String Expressions," SAS 2003, LNCS 2694, year 2003.
G. Wassermann et al., "Sound and Precise Analysis of Web Applications for Injection Vulnerabilities," Proceedings of PLDI'07, Jun. 11-13, 2007.
J. Engelfriet et al., "MSO definable string transductions and two-way finite state transducers," ACM Transactions on Computational Logic (TOCL), Apr. 2001.
Y. Minamide, "Static approximation of dynamically generated web pages," International WWW Conference, May 10-14, 2005.

*Primary Examiner* — Mohammad W Reza
(74) *Attorney, Agent, or Firm* — Vazken Alexanian

(57) ABSTRACT

An illegal pattern and a computer program having a method are received. The method has one or more return statements, and a number of basic blocks. The method is normalized so that each return statement of the target method relating to the illegal pattern returns a constant Boolean value. A first path condition and a second path condition for one or more corresponding paths is determined such that one or more corresponding basic blocks return a constant Boolean value of true for the first path condition and a constant Boolean value of false for the second path condition. An unsatisfiability of each path condition is determined using a monadic second-order logic (M2L) technique. Where the unsatisfiability of either path condition is false, the method is reported as not being a validator. Where the unsatisfiability of either path condition is true, the method is reported as being a validator.

20 Claims, 4 Drawing Sheets

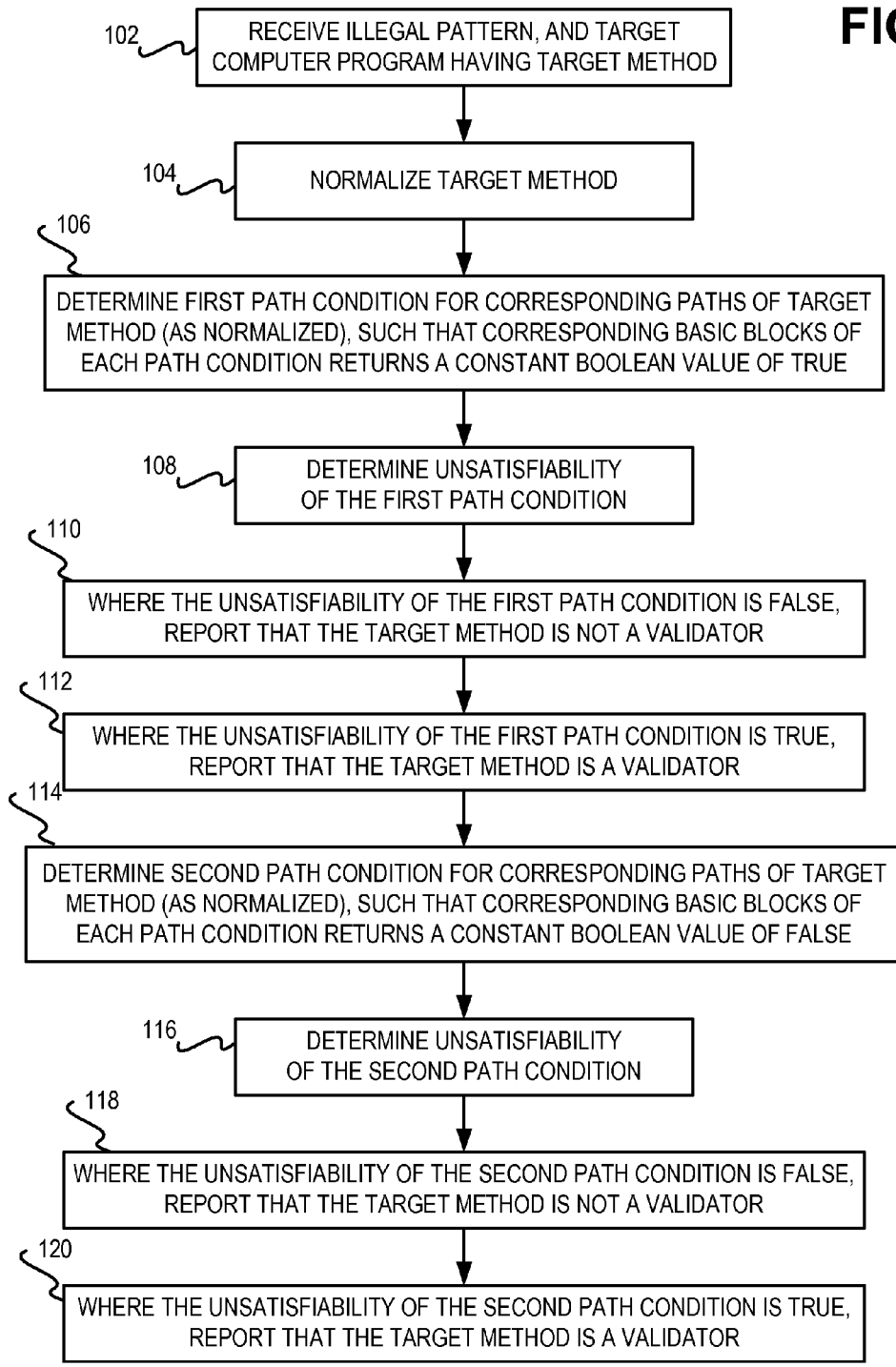

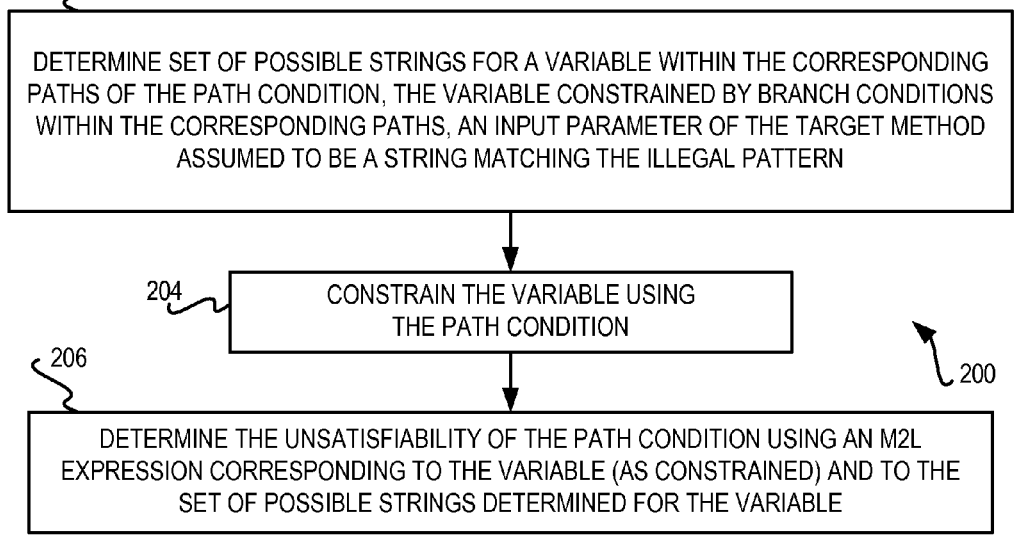
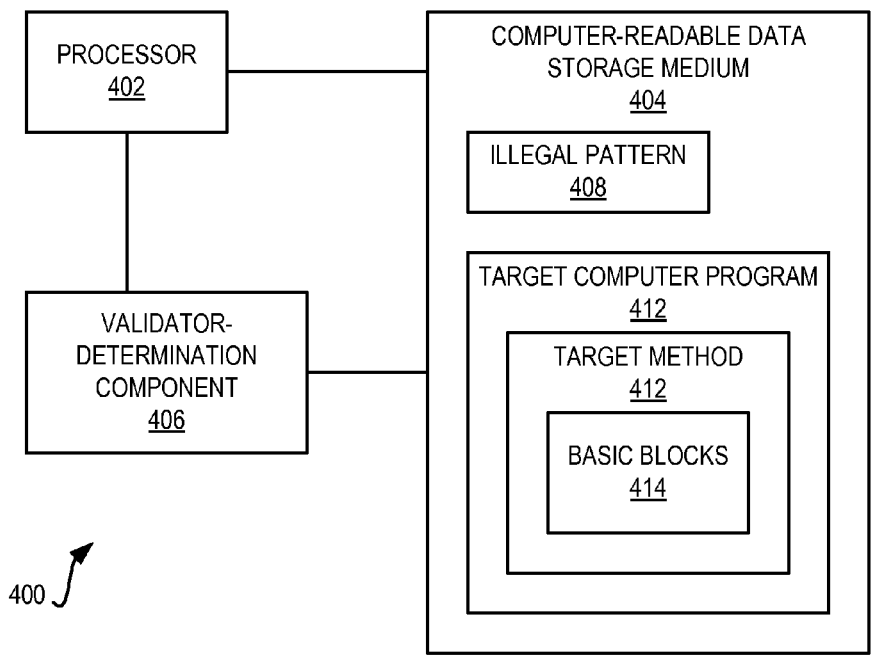

FIG 3A

```
public static boolean isValid(String s) {
    return !s.contains("<");
}
```

FIG 3B

```
public static boolean isValid(String s) {
    if (s.contains("<")) {
        return false;
    }
    else {
        return true;
    }
}
```

FIG 3C

```
public static boolean isValid(String s) {
    if (s.contains("<")) {
        return false;
    }
    else {
        return true; // → !s.contains("<")
    }
}
```

FIG 3D

```
public static boolean isValid(String s) {
    if (s.contains("<")) {
        return false;
    }
    else {
        return true; // → s matches ".*[<>].*"
    }
}
```

FIG 3E

```
public static boolean isValid(String s) {
    if (s.contains("<")) {
        return false;
    }
    else {
        return true; // → (s matches ".*[<>].*" & !s.contains("<")
    }
}
```

DETERMINING WHETHER METHOD OF COMPUTER PROGRAM IS A VALIDATOR

BACKGROUND

A validator is a method, or process, of a computer program that verifies whether an input string can be safely employed within security-sensitive operations, such as in conjunction with web applications on intranets and on the Internet. In this respect, a validator is distinguished from a sanitizer, which is a method of a computer program that processes an input string so that it can be safely employed within such security-sensitive operations. Validators and sanitizers are thus used to ensure that web applications are not exposed to malicious input strings that cause the web applications to perform incorrectly, such as by compromising security of the web applications and their underlying data.

SUMMARY OF THE INVENTION

A method of an embodiment of the invention includes a processor receiving an illegal pattern and a computer program having a target method. The target method has one or more return statements, as well as a number of basic blocks. The target method is normalized by the processor so that each return statement of the target method relating to the illegal pattern returns a constant Boolean value. A first path condition for one or more corresponding paths of the target method, as normalized, is determined by the processor such that one or more corresponding basic blocks return a constant Boolean value of true. An unsatisfiability of the first path condition is determined by the processor using a monadic second-order logic (M2L) technique. Where the unsatisfiability of the first path condition is true, the processor reports that the target method is a positive validator. Where the unsatisfiability of the first path condition is false, the processor reports that the target method is not a positive validator.

A non-transitory computer-readable data storage medium of an embodiment of the invention has a computer program stored thereon. Execution of the computer program by a processor causes a method to be performed. The method includes receiving an illegal pattern and a target computer program having a target method. The target method has one or more return statements, as well as a number of basic blocks. The target method is normalized so that each return statement of the target method relating to the illegal pattern returns a constant Boolean value.

A first path condition and a second path condition are determined for one or more corresponding paths of the target method, as normalized, such that one or more corresponding basic blocks return a constant Boolean value of true for the first path condition and return a constant Boolean value of false for the second path condition. An unsatisfiability of the first path condition and an unsatisfiability of the second path condition are determined using a monadic second-order logic (M2L) technique. Where the unsatisfiability of the first path condition is false, the target method is reported as not a positive validator. Where the unsatisfiability of the first path condition is true, the target method is reported as a positive validator. Where the unsatisfiability of the second path condition is false, the target method is reported as not a negative validator. Where the unsatisfiability of the second path condition is true, the target method is reported as a negative validator.

A system of an embodiment of the invention includes a processor, a computer-readable data storage medium, and a validator-determination component. The computer-readable data storage medium stores an illegal pattern and a target computer program having a target method. The target method has a number of basic blocks. The validator-determination component is implemented at least by the hardware. The component is to normalize the target method so that each return statement of the target method relating to the illegal pattern returns a constant Boolean value. The component is to determine a first path condition for one or more corresponding paths of the target method, as normalized, such that one or more corresponding basic blocks return a constant Boolean value of true. The component is to determine an unsatisfiability of the first path condition, using a monadic second-order logic (M2L) technique, and where the unsatisfiability of the first path condition is true, report that the target method is a positive validator.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method to determining whether a target method is a validator, according to an embodiment of the invention.

FIG. 2 is a flowchart of a method that can be used in the method of FIG. 1 to determine an unsatisfiability of a path condition for the target method, according to an embodiment of the invention.

FIGS. 3A, 3B, 3C, 3D, and 3E are diagrams depicting exemplary performance of the methods of FIGS. 1 and 2 in relation to a rudimentary target method, according to an embodiment of the invention.

FIG. 4 is a diagram of a representative system, according to an embodiment of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a validator is a method of a computer program that verifies whether an input string can be safely employed within security-sensitive operations. An example of a simple validator, for instance, is the computer program "public static Boolean isValid(String s {return !s.contains("<");}". This computer program determines whether an input string s contains the character "<" or not. If it does, then the input string may not be able to be safely employed within security-sensitive operations.

For a validator to correctly perform its functionality, the validator should itself be verified to determine that the validator accurately and properly performs the functionality. An example of an incorrect simple validator, for instance, is the computer program "public static Boolean isValid(String s {return !s.substring(1).contains("<");}". This computer program determines just whether a portion of an input string s contains the character "<" or not. Because the computer program does not check the entire string s, the computer program is not performing its functionality properly.

It is noted that a validator can be a positive validator and or a negative validator. Where a validator is both a positive validator and a negative validator, the validator may be referred to as a complete validator, or simply a validator. A positive validator is a validator that never returns the Boolean value of true any time an input string contains an illegal character(s). A negative validator is a validator that never returns the Boolean value of false any time an input string contains an illegal character(s). A validator may be verified as to whether it is properly a positive validator, a negative validator, or both a positive validator and negative validator (i.e., a complete validator).

Existing string-verification techniques are not well suited to verifying validators. By comparison, disclosed herein are approaches for verifying a validator. Specifically, FIG. 1 shows a method 100 for determining whether a target method of a target computer program is a validator, according to an embodiment of the invention. The method 100 can be implemented as a computer program stored on a non-transitory computer-readable data storage medium. Execution of the computer program by a processor, such as a processor of a computing device, thus results in the method 100 being performed. This computer program is not to be confused with the target computer program in relation to which the method 100 is performed; likewise, the method 100 is not to be confused with the target method in relation to which the method 100 is performed.

An illegal pattern, and a target computer program having a target method, are received (102). The illegal pattern is the pattern in relation to which the target method of the target computer program is tested for being a validator. For example, if the target method is to validate whether or not the string "<" is within an input string, then the string "<" is the illegal pattern in relation to which this target method is tested.

The target method has one or more return statements. A return statement is an instruction or a series of instruction within the target method that returns whether or not an input string contains the illegal pattern. There may be more than one return statement within the target method. The target method further has a number of basic blocks. A basic block is simply an instruction or a series of instructions that leads up to a return statement of the target method.

The target method is normalized so that each return statement relating to the illegal pattern returns a constant Boolean value (104). A constant Boolean value is true or false. Such a Boolean value is said to be constant in that a return statement always returns true (or always returns false), for an input string including the illegal pattern. A return statement within the target method may originally return a value other than a constant Boolean value. Normalizing the target method thus means modifying the target method so that each return statement relating to the illegal pattern instead returns true or false.

A first path condition for one or more corresponding paths of the target method (as normalized) are determined, such that one or more corresponding basic blocks of the first path condition return a constant Boolean value of true (106). A path condition is a statement within the target method that is evaluated to determine which path of two paths is to be followed. For instance, a path condition may be part of an IF/THEN/ELSE series of instructions. The one or more corresponding basic blocks of a path condition are an instruction or a series of instruction in which the path condition is evaluated within the target method.

The unsatisfiability of the first path condition is determined, using a monadic second-order logic (M2L) technique (108). The unsatisfiability of the first path condition determines whether the first path condition always return its constant Boolean value of true in relation to an input string including the illegal pattern. If the unsatisfiability of the first path condition is false, then this means that the first path condition does not always return its associated constant Boolean value of true in relation to an input string including the illegal pattern. By comparison, if this unsatisfiability is true, then this means that the first path condition never return its associated constant Boolean value of true in relation to an input string including the illegal pattern.

Where the unsatisfiability of the first path condition is false, then it is known that the target method cannot be a positive validator (i.e., a validator for the associated constant Boolean value of true), and the method 100 reports that the target method is not a positive validator (110). By comparison, where the unsatisfiability of the first path condition is true, then it is known that the target method is a positive validator, and the method 100 reports that the target method is a positive validator (112). As such, whether or not the target method is a positive validator, based on the unsatisfiability of the first path condition, has been assessed and reported thus far in the method 100. The reporting of parts 110 and 112 can take one or more of many different forms, such as a message displayed on a graphical user interface (GUI), an electronic message like email, and so on.

Next, a second path condition for the same one or more corresponding paths of the target method (as normalized) are determined, such that the same one or more corresponding basic blocks return a constant Boolean value of false (114). The second path condition is the corollary path condition to the first path condition. Whereas the first path condition returns a constant Boolean value of true, the second path condition correspondingly returns a constant Boolean value of false.

The unsatisfiability of the second path condition is determined, also using an M2L technique (116). The unsatisfiability of the second path condition determines whether the second path condition always return its constant Boolean value of false in relation to an input string including the illegal pattern. If the unsatisfiability of the second path condition is false, then this means that the second path condition does not always return its associated constant Boolean value of false in relation to an input string including the illegal pattern. By comparison, if this unsatisfiability is true, then this means that the second path condition never returns its associated constant Boolean value of false in relation to an input string including the illegal pattern.

Where the unsatisfiability of the second path condition is false, then it is known that the target method cannot be a negative validator (i.e., a validator for the associated Boolean value of false), and the method 100 reports that the target method is not a negative validator (118). By comparison, where the unsatisfiability of the second path condition is true, then it is known that the target method is a negative validator, and the method 100 reports that the target method is a negative validator (120). As such, whether or not the target method is a validator, based on the unsatisfiability of the second path condition, has been assessed and reported. The reporting of parts 118 and 120 can also take one or more of many different forms, such as a message displayed on a GUI, an electronic message like email, and so on.

FIG. 2 shows a method 200 for determining the unsatisfiability of a path condition, according to an embodiment of the invention. The method 200 may be employed to implement parts 108 and 116 of the method 100. A set of possible strings for a variable within the one or more corresponding paths of the path condition is determined (202). The variable is constrained by the branch conditions within the one or more corresponding paths. The input parameter of the target method is assumed to be a string matching the illegal pattern, as before. A branch condition dictates that the one or more corresponding paths will be followed. As such, the set of possible strings includes a number, if not all, of the strings that the variable can take on and realize the branch condition that dictates that the one or more corresponding paths will be followed.

The variable is further constrained by the path condition itself (204). For instance, if the path condition itself has constraints more particular than the branch condition, then the variable is further constrained by these constraints. Ultimately, the unsatisfiability of the path condition is determined using an M2L expression corresponding to the variable as has been constrained and to the set of possible strings determined for this variable (206).

The M2L technique-based approach of the method 200 can be implemented in accordance with the general approaches described in the following two patent applications. The first patent application is "system, method, and program for determining validity of string," filed on Jun. 29, 2010, and assigned application Ser. No. 12/825,610 . The second patent application is "modular and/or demand-driven string analysis of a computer program," filed on Oct. 19, 2010, and assigned application Ser. No. 12/907,974 . Both of these patent applications described M2L-based approaches that can be used to implement the method 200. However, neither patent application particularly describes determining unsatisfiability in relation to validator verification.

FIGS. 3A-3E show exemplary performance of the methods 100 and 200 in relation to a rudimentary validator. FIG. 3A shows a target method of a target computer program, according to an embodiment of the invention. The method 100 is to determine, using the method 200, whether the target method of FIG. 3A is a proper validator or not. As such, the method 100 receives the target method of FIG. 3A in part 102 thereof.

FIG. 3B shows the target method of FIG. 3A after the normalization of part 104 of the method 100 has been performed, according to an embodiment of the invention. FIG. 3C shows the normalized target method of FIG. 3B after the path condition determination of part 106 of the method 100 has been performed. FIG. 3D shows the normalized target method of FIG. 3C after part 202 of the method 200 has been performed. FIG. 3E shows the normalized target method of FIG. 3D after part 204 of the method 200 has been performed. As such, part 206 of the method 200 can be performed in relation to target method as depicted in FIG. 3E.

In conclusion, FIG. 4 shows a representative system 400, according to an embodiment of the invention. The system 400 can be implemented over one or more computing devices, like desktop computers. The system 400 includes a processor 402, a computer-readable data storage medium 404, and a validator-determination component 406. The computer-readable data storage medium 404 stores an illegal pattern 408 and a target computer program 410 having a target method 412 that itself has a number of basic blocks 414.

The validator-determination component 406 is implemented using the processor 402. For instance, in one embodiment, the component 406 may be one or more computer programs stored on a computer-readable data storage medium like the medium 404 or another computer-readable data storage medium 404. Execution of these computer programs by the processor 402 thus results in the functionality of the component 406 being realized. The validator-determination component 406 specifically performs the methods 100 and 200 in relation to the target method 412 to determine whether the target method 412 is a validator in relation to the illegal pattern 408.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    receiving an illegal pattern and a computer program having a target method, by a processor, the target method having one or more return statements, the target method having a plurality of basic blocks;
    normalizing the target method by the processor so that each return statement of the target method relating to the illegal pattern returns a constant Boolean value;
    determining a first path condition for one or more corresponding paths of the target method, as normalized, by the processor such that one or more corresponding basic blocks return a constant Boolean value of true;
    determining an unsatisfiability of the first path condition, by the processor, using a monadic second-order logic (M2L) technique; and,
    where the unsatisfiability of the first path condition is false, reporting by the processor that the target method is not a positive validator.

2. The method of claim 1, wherein a validator is a process to determine whether or not an input string can be safely used in relation to security-sensitive operations within the computer program.

3. The method of claim 1, further comprising:
    where the unsatisfiability of the first path condition including the path condition is true, reporting by the processor that the target method is a positive validator.

4. The method of claim 1, further comprising:
    determining a second path condition for the one or more corresponding paths of the target method, as normalized, by the processor such that the one or more corresponding basic blocks return a constant Boolean value of false; and,
    determining an unsatisfiability of the second path condition, by the processor, using the M2L technique.

5. The method of claim 4, further comprising:
    where the unsatisfiability of the second path condition is false, reporting by the processor that the target method is not a negative validator.

6. The method of claim 5, further comprising:
    where the unsatisfiability of the second path condition is true, reporting by the processor that the target method is a negative validator.

7. The method of claim 1, wherein determining the unsatisfiability of the first path condition comprises:
    determining a set of possible strings for a variable within the one or more corresponding paths, the variable constrained by branch conditions within the one or more corresponding paths, an input parameter of the target method assumed to be a string matching the illegal pattern.

8. The method of claim 7, wherein determining the unsatisfiability of the first path condition further comprises:
    constraining the variable using the one or more path conditions.

9. The method of claim 8, wherein determining the unsatisfiability of the first path condition further comprises:

determining the unsatisfiability of the first path condition using an M2L expression corresponding to the variable as constrained and to the set of possible strings determined for the variable.

10. A non-transitory computer-readable data storage medium having a computer program stored thereon, execution of the computer program by a processor causing a method to be performed, the method comprising:
receiving an illegal pattern and a target computer program having a target method, the target method having one or more return statements, the target method having a plurality of basic blocks;
normalizing the target method so that each return statement of the target method relating to the illegal pattern returns a constant Boolean value;
determining a first path condition and a second path condition for one or more corresponding paths of the target method, as normalized, such that one or more corresponding basic blocks return a constant Boolean value of true for the first path condition and return a constant Boolean value of false for the second path condition;
determining an unsatisfiability of the first path condition and an unsatisfiability of the second path condition, using a monadic second-order logic (M2L) technique;
where the unsatisfiability of the first path condition is false, reporting that the target method is a not a positive validator;
where the unsatisfiability of the first path condition is true, reporting that the target method is a positive validator;
where the unsatisfiability of the second path condition is false, reporting that the target method is not a negative validator; and,
where the unsatisfiability of the second path condition is true, reporting that the target method is a negative validator.

11. The non-transitory computer-readable data storage medium of claim 10, wherein a validator is a process to determine whether or not an input string can be safely used in relation to security-sensitive operations within the computer program.

12. The non-transitory computer-readable data storage medium of claim 10, wherein determining the unsatisfiability of each path condition of the first path condition and the second path condition comprises:
determining a set of possible strings for a variable within the one or more corresponding paths, the variable constrained by branch conditions within the one or more corresponding paths, an input parameter of the target method assumed to be a string matching the illegal pattern.

13. The non-transitory computer-readable data storage medium of claim 12, wherein determining the unsatisfiability of each path condition of the first path condition and the second path condition further comprises:
constraining the variable using the path condition.

14. The non-transitory computer-readable data storage medium of claim 13, wherein determining the unsatisfiability of each path condition of the first path condition and the second path condition further comprises:
determining the unsatisfiability of the path condition using an M2L expression corresponding to the variable as constrained and to the set of possible strings determined for the variable.

15. A system comprising: a processor; a non-transitory computer-readable data storage medium storing an illegal pattern and a target computer program having a target method, the target method having a plurality of basic blocks; and, a validator-determination component implemented at least by the hardware to:
normalize the target method so that each return statement of the target method relating to the illegal pattern returns a constant Boolean value; determine a first path condition for one or more corresponding paths of the target method, as normalized, such that one or more corresponding basic blocks return a constant Boolean value of true; determine an unsatisfiability of the first path condition, using a monadic second-order logic (M2L) technique; and, where the unsatisfiability of the first path condition is false, report that the target method is not a positive validator.

16. The system of claim 15, wherein a validator is a process to determine whether or not an input string can be safely used in relation to security-sensitive operations within the computer program.

17. The system of claim 15, wherein the validation-determination component is further to, where the unsatisfiability of the first path condition is true, report that the target method is a positive validator.

18. The system of claim 15, wherein the validation-determination component is to determine the unsatisfiability of the first path condition by:
determining a set of possible strings for a variable within the one or more corresponding paths, the variable constrained by branch conditions within the one or more corresponding paths, an input parameter of the target method assumed to be a string matching the illegal pattern.

19. The system of claim 18, wherein the validation-determination component is to determine the unsatisfiability of the first path condition by further:
constraining the variable using the first path condition.

20. The system of claim 19, wherein the validation-determination component is to determine the unsatisfiability of the path condition by further:
determining the unsatisfiability of the first path condition using an M2L expression corresponding to the variable as constrained and to the set of possible strings determined for the variable.

* * * * *